US006888579B2

(12) United States Patent
Miller

(10) Patent No.: US 6,888,579 B2
(45) Date of Patent: May 3, 2005

(54) METHOD AND SYSTEM FOR TINT CONTROL FOR COMPONENT VIDEO SIGNALS

(75) Inventor: William G. Miller, Knoxville, TN (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 523 days.

(21) Appl. No.: 09/992,926

(22) Filed: Nov. 5, 2001

(65) Prior Publication Data

US 2003/0086019 A1 May 8, 2003

(51) Int. Cl.$^7$ .................................................. H04N 9/64
(52) U.S. Cl. ...................................... 348/654; 348/649
(58) Field of Search ................................. 348/649–654, 348/645–648, 638–641, 643, 644, 662, 713; H04N 9/64

(56) References Cited

U.S. PATENT DOCUMENTS 4,122,491 A * 10/1978 Yamaguchi et al. ........ 348/641
4,216,493 A * 8/1980 Hosoya ...................... 348/647

* cited by examiner

*Primary Examiner*—Michael Lee
(74) *Attorney, Agent, or Firm*—Edward W. Goodman

(57) ABSTRACT

A method and system are provided for controlling tint of component video signals. The system includes a first input for receiving a first component video signal; a second input for receiving a second component video signal; circuitry including a first differential amplifier and a second differential amplifier for receiving the first and second component video signals from the first and second inputs, respectively; a first output connected to the circuitry for outputting a first tint control adjustment signal for the first component video signal; and a second output connected to the circuitry for outputting a second tint control adjustment signal for the second component video signal. The first outputted signal is represented as $V+kU-2ckU$ and the second outputted signal is represented as $U-kV+2ckV$, where V represents the first component video signal, U represents the second component video signal, k is a constant, and c is a value greater than or equal to zero and less than or equal to one.

18 Claims, 2 Drawing Sheets

METHOD AND SYSTEM FOR TINT CONTROL FOR COMPONENT VIDEO SIGNALS

BACKGROUND OF THE INVENTION

1. Technical Field

The present disclosure relates generally to tint control, and more particularly, to a method and system for tint control for component video signals.

2. Background of the Related Art

Common practice when decoding NTSC signals is for a "tint" or "hue" adjustment to compensate for possible differential phase errors between a QAM chroma signal and its accompanying burst reference. Tint adjustment is also useful in compensating for other possible system errors.

Additionally, tint adjustment together with saturation adjustment allows for variations in personal preference to be accommodated, permitting any color to be shifted in saturation and hue without affecting the gray scale. In order to retain this capability for video signals that do not experience NTSC decoding, such as component video signals, e.g., from a DVD player or set-top box, it is necessary to apply tint adjustment to the baseband color difference signals.

The three main component video signals as known in the art are Y, B-Y and R-Y. Derived from the Y, B-Y and R-Y component video signals, Y/U/V and Y/Pb/Pr are defined as follows: U=(B-Y)/2.03, V=(R-Y)/1.14, Pb=(B-Y)/1.772 and Pr=(R-Y)/1.402. U and V amplitude scaling is applied in encoding an NTSC signal to prevent RF overmodulation as known in the art. Pb and Pr amplitude scaling is applied to parallel component video signals to make each signal approximately equal to 0.7 Volt p-p.

Prior art tint control circuitry, as shown by FIG. 1, derive the bi-directional crosstalk components, i.e., +/−kU for coupling into V and −/+kV for coupling into U, necessary for tint control. The opposite polarities associated with the bi-directional crosstalk components are significant, since they are equivalent to the effect of a tint control in NTSC decoding which is derived as follows:

As known in the art, an NTSC chroma signal may be represented as follows: C(t)=[V cos ωt+U sin ωt], 107 =2πfsc. Therefore, demodulating V and U with 2 cos(ωt±φ) and 2 sin(ωt±φ), respectively, and tint range being ±φ, the bi-directional crosstalk components can be derived.

$$
\begin{aligned}
V_{demodulation} &= [V\cos(\omega t) + U\sin(\omega t)]2\cos(\omega t \pm \phi) \\
&= 2V\cos(\omega \tau)\cos(\omega t \pm \phi) + 2U\sin(\omega t)\cos(\omega t \pm \phi) \\
&= V[\cos(2\omega t \pm \phi) + \cos(\pm \phi)] + U[\sin(2\omega t \pm \phi) - \sin(\pm \phi)] \\
&= V\cos(\pm \phi) - U\sin(\pm \phi), \text{ disregarding } 2\omega t \text{ terms} \\
&= V - U\sin(\pm \phi), \text{ for small values of } \phi \\
&= V - kU, k = \sin\phi \\
U_{demodulation} &= [V\cos(\omega t) + U\sin(\omega t)]2\sin(\omega t \pm \phi) \\
&= 2V\cos(\omega \tau)\sin(\omega t \pm \phi) + 2U\sin(\omega t)\sin(\omega t \pm \phi) \\
&= V[\sin(2\omega t \pm \phi) + \sin(\pm \phi)] - U[\cos(2\omega t \pm \phi) - \cos(\pm \phi)] \\
&= U\cos(\pm \phi) + V\sin(\pm \phi), \text{ disregarding } 2\omega t \text{ terms} \\
&= U + V\sin(\pm \phi), \text{ for small values of } \phi \\
&= U + kV, k = \sin\phi
\end{aligned}
$$

As evident from FIG. 1, prior art tint control circuitry for high definition monitors and other imaging devices and appliances for obtaining the bi-directional crosstalk components +/−kU and +/−kV is generally complex. Further, the prior art tint control circuitry as shown by FIG. 1 employs two modulator/demodulator ICs, i.e., the MC1496 balanced modulator/demodulator ICs which contains eight transistors, and peripheral circuitry, which add to the cost of the high definition monitors and other imaging devices and appliances.

A need therefore exists for a method and system for tint control for component video signals which provide a non-complex approach for deriving the bi-directional crosstalk components necessary for tint control.

SUMMARY OF THE INVENTION

The present disclosure provides a method and system for tint control for component video signals. The system and method of the present disclosure provide significant less complex circuitry and a less complex approach, respectively, for deriving the bi-directional crosstalk components necessary for tint control. According to the present disclosure, the system of the present invention provides circuitry for receiving the U and V component video signals and outputting U' and V' components, which are equivalent to the bi-directional crosstalk components.

BRIEF DESCRIPTION OF THE DRAWINGS

The invention is further explained by way of example and with reference to the accompanying drawings, wherein.

DETAILED DESCRIPTION OF PREFERRED EMBODIMENTS

Figure 2:
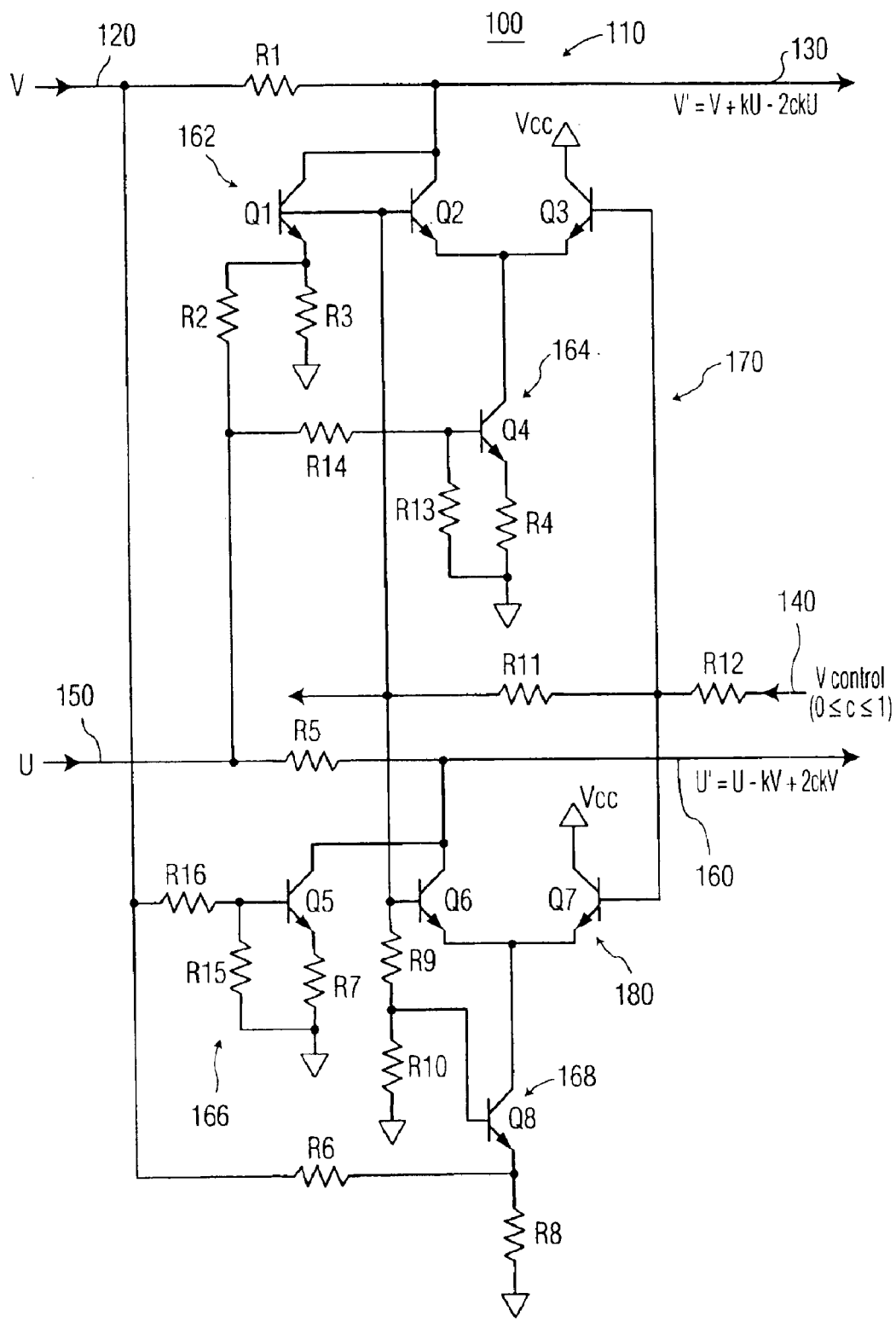
FIG. 2 is a schematic diagram of circuitry for deriving the bi-directional crosstalk components necessary for tint control according to the present invention.

FIG. 2 is a schematic diagram of a system having circuitry for deriving the bi-directional crosstalk components U' and V' for tint control according to the present invention. The system is designated generally by reference numeral 100 and includes circuitry 110 for receiving video component signals U and V, as well as a V control signal and operating voltages Vbb and Vcc. The circuitry 110 outputs tint control adjustment signals U' and V' to be used for tint control adjustment, where U' equals U−kV+2 ckV and V' equals V+kU−2 ckU, and where k is a constant, and c is a value greater than or equal to zero and less than or equal to one, i.e., $0 \leq c \leq 1$.

The circuitry 110 includes resistors R1–R16 and transistors Q1–Q8. Video component signal V is received by input lead 120 connected to a first terminal of resistors R1, R6 and R16. A second terminal of resistor R1 and the collectors of transistors Q1 and Q2 are connected to output lead 130. The output lead 130 provides the bi-directional crosstalk component V'.

A first terminal of resistors R2 and R3 is connected to an emitter of transistor Q1. The second terminal of resistor R3 is connected to ground. The second terminal of resistor R2 is connected to a first terminal of resistors R5 and R14. A base of transistor Q1 is connected to a base of transistors Q2 and Q6 and a first terminal of resistors R9 and R11. The base of transistor Q1 is also connected to operating voltage Vbb. The second terminal of transistor R14 is connected to a base of transistor Q4 and a first terminal of resistor R13. An emitter of transistor Q4 is connected to a first terminal of resistor R4. A second terminal of resistor R13 and a second terminal of resistor R13 are connected to ground.

A collector of transistor Q3 is connected to operating voltage Vcc. An emitter of transistor Q3 is connected to an emitter of transistor Q2 and a collector of transistor Q4. A base of transistor Q3 is connected to a first terminal of resistor R12, a second terminal of resistor R11 and a base of transistor Q7. A second terminal of resistor R12 receives the V control signal via input lead 140.

An input lead 150 connected to the first terminal of resistor R5 receives input signal U. A second terminal of resistor R5 outputs U' via output lead 160 and is connected to collectors of transistors Q5 and Q6. A second terminal of resistor R16 is connected to a base of transistor Q5 and a first terminal of resistor R15. An emitter of transistor Q5 is connected to a first terminal of resistor R7. A second terminal of resistors R7 and R15 is connected to ground. A second terminal of resistor R9 is connected to a base of transistor Q8 and a first terminal of resistor R10. A second terminal of resistor R10 is connected to ground.

A collector of transistor Q7 is connected to operating voltage Vcc. An emitter of transistor Q7 is connected to an emitter of transistor Q6 and a collector of transistor Q8. An emitter of transistor Q8 is connected to a second terminal of resistor R6 and a first terminal of resistor R8. A second terminal of resistor R8 is connected to ground.

To output the U' and V' signals, i.e., the tint control adjustment signals for the U and V component video signals, respectively, fixed precision tint offsets are first applied by the circuitry 110 to each component color difference signal, i.e., the U and V component video signals. Variable unidirectional "correction" of the opposite polarity is also applied, having a maximum correction of two times a fixed offset, so that applying one-half the maximum variable offset, corresponding to mid-setting of the tint control, restores the tint to a neutral, unaltered condition.

During operation of the circuitry 110, the V component video signal is transformed into V' by the total current supplied from Q1 and Q2. Q1 supplies a fixed offset of +kU while Q2 supplies a variable offset of $-2$ ckU, where $0<c<1$ and is determined by the Q2/Q3 inter-base voltage, to provide an output equal to V+kU$-2$ ckU which is equal to V'.

In similar fashion, U is transformed into U' by the total current supplied from Q5 and Q6. Q5 supplies a fixed offset of $-$kV while Q6 supplies a variable offset of $+2$ ckV, where $0<c<1$ and is determined by the Q6/Q7 inter-base voltage, to provide an output equal to U$-$kV$+2$ ckV which is equal to U'. One skilled in the art can appreciate that V is transformed into V' and U is transformed into U' by the circuitry 110, since the Q1 stage 162, which includes transistor Q1 and resistors R2 and R3 is a non-inverting stage; the Q4 stage 164, which includes transistor Q4 and resistors R4 and R13 is an inverting stage; the Q5 stage 166, which includes transistor Q5 and resistors R5, R7 and R16 is an inverting stage; and the Q8 stage 168, which includes transistor Q8 and resistors R8, R9 and R10 is a non-inverting stage.

High accuracy and stability is ensured at tint center, due to the two balanced differential amplifiers 170, 180. The first differential amplifier 170 is mainly formed by transistors Q2, Q3 and Q4 and resistor R4, and the second differential amplifier 180 is mainly formed by transistors Q6, Q7 and Q8 and resistor R8. The resistance of resistors R4 and R8, as well as resistors R1–R3, R5–R7 and R9–R16 is selected to ensure proper operation of the circuitry 110 in different applications, e.g., DC and AC applications.

Further, during operation of the circuitry 110, all of the transistors Q1–Q8 are active at all times. During different times of operation, the current is split between transistors Q2 and Q3 and transistors Q6 and Q7 over a tint control range. Preferably, the system 100 is designed such that the current is split by having one-third of the current entering the differential amplifiers 170, 180 go to the left side of the differential amplifiers 170, 180 and two-thirds of the current entering the differential amplifiers 170, 180 go to the right side of the differential amplifiers 170, 180.

Figure 1:
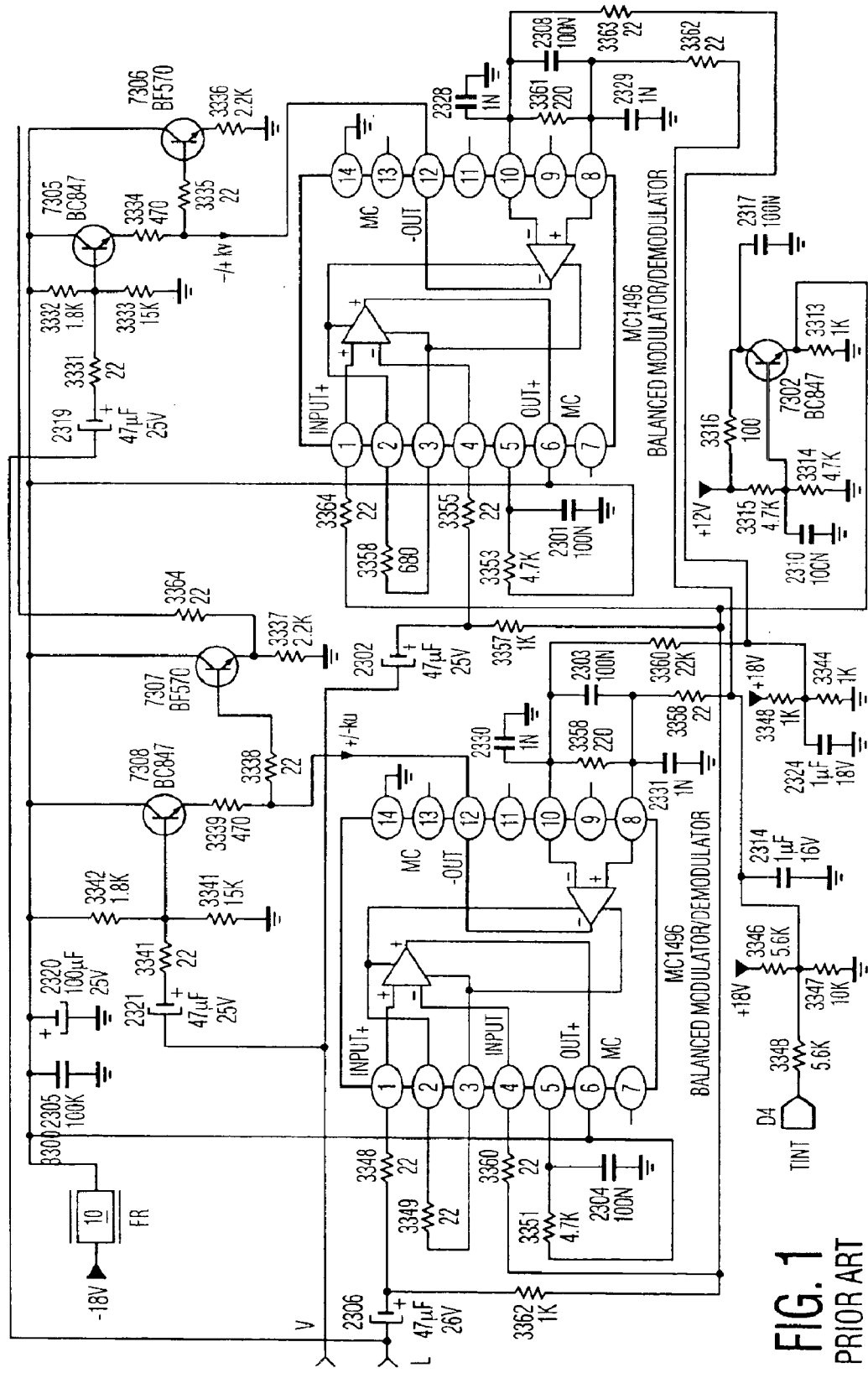
FIG. 1 is a schematic diagram of prior art circuitry for deriving the bi-directional crosstalk components necessary for tint control.

Unlike the prior art circuitry of FIG. 1, the system 100 of the present invention does impart varying DC level shifts into the U and V signals as a function of the tint control setting. However, this is not a concern in applications in which the signals are AC coupled and clamped in subsequent processing.

It will be understood that various modifications may be made to the embodiments disclosed herein and that the above description should not be construed as limiting, but merely as exemplifications of preferred embodiments. Accordingly, those skilled in the art will envision other modifications within the scope and spirit of the claims appended hereto.

What is claimed is:

1. A tint control system for component video signals comprising:

a first input for receiving a first component video signal;

a second input for receiving a second component video signal;

circuitry including a first differential amplifier and a second differential amplifier for receiving the first and second component video signals from the first and second inputs, respectively, said first and second differencial amplifiers each including a pair of transistors;

a first output connected to the circuitry for outputting a first tint control adjustment signal for the first component video signal; and a second output connected to the circuitry for outputting a second tint control adjustment signal for the second component video signal, wherein a collector of one transistor of each pair of transistors of the first and second differential amplifiers is connected to an operating voltage.

2. The system according to claim 1, wherein the first outputted signal is represented as V+kU$-$2ckU, where V represents the first component video signal, U represents the second component video signal, k is a constant, and c is a value greater than or equal to zero and less than or equal to one.

3. The system according to claim 1, wherein the second outputted signal is represented as U$-$kV+2ckV, where V represents the first component video signal, U represents the second component video signal, k is a constant, and c is a value greater than or equal to zero and less than or equal to one.

4. The system according to claim 1, wherein a base of a respective transistor of the pair of transistors of the first differential amplifier is directly connected to a base of a respective transistor of the pair of transistors of the second differential amplifier.

5. The system according to claim 1, wherein the emitters of each pair of transistors are connected to ground via a transistor connected in series with a resistor.

6. A tint control system for component video signals comprising:

a first input for receiving a first component video signal;

a second input for receiving a second component video signal;

circuitry including a first differential amplifier and a second differential amplifier for receiving the first and second component video signals from the first and second inputs, respectively, said first and second differential amplifiers each including a pair of transistors;

a first output connected to the circuitry for outputting a first tint control adjustment signal for the first component video signal; and a second output connected to the circuitry for outputting a second tint control adjustment signal for the second component video signal, wherein a collector of one transistor of the pair of transistors of the first differential amplifier is connected to the first input via a resistor and to the first output.

7. A tint control system for component video signals comprising:

a first input for receiving a first component video signal;

a second input for receiving a second component video signal;

circuitry including a first differential amplifier and a second differential amplifier for receiving the first and second component video signals from the first and second inputs, respectively, said first and second differential amplifiers each including a pair of transistors;

a first output connected to the circuitry for outputting a first tint control adjustment signal for the first component video signal; and a second output connected to the circuitry for outputting a second tint control adjustment signal for the second component video signal, wherein a collector of one transistor of the pair of transistors of the second differential amplifier is connected to the second input via a resistor and to the second output.

8. A tint control system for component video signals comprising:

a first input for receiving a first component video signal;

a second input for receiving a second component video signal;

circuitry including a first differential amplifier and a second differential amplifier for receiving the first and second component video signals from the first and second inputs, respectively, said first and second differential amplifiers each including a pair of transistors;

a first output connected to the circuitry for outputting a first tint control adjustment signal for the first component video signal; and a second output connected to the circuitry for outputting a second tint control adjustment signal for the second component video signal, wherein a base of one transistor of the pair of transistors of the first differential amplifier is connected to a third input via a resistor for receiving a control signal for the first component video signal.

9. A tint control system for component video signals comprising:

a first input for receiving a first component video signal;

a second input for receiving a second component video signal;

circuitry including a first differential amplifier and a second differential amplifier for receiving the first and second component video signals from the first and second inputs, respectively, said first and second differential amplifiers each including a pair of transistors;

a first output connected to the circuitry for outputting a first tint control adjustment signal for the first component video signal; and a second output connected to the circuitry for outputting a second tint control adjustment signal for the second component video signal, wherein a base of one transistor of the pair of transistors of the second differential amplifier is connected to a third input via a resistor for receiving a control signal for the first component video signal.

10. A method for controlling tint of component video signals, the method comprising the steps of:

receiving a first component video signal;

receiving a second component video signal;

providing circuitry including a first differential amplifier and a second differential amplifier for receiving the first and second component video signals, respectively, the first and second differential amplifiers each including a pair of transistors;

outputting a first tint control adjustment signal for the first component video signal; and outputting a second tint control adjustment signal for the second component video signal, wherein a collector of one transistor of each pair of transistors is connected to an operating voltage.

11. The method according to claim 10, wherein the first outputted signal is represented as $V+kU-2ckU$, where V represents the first component video signal, U represents the second component video signal, k is a constant, and c is a value greater than or equal to zero and less than or equal to one.

12. The method according to claim 10, wherein the second outputted signal is represented as $U-kV+2ckV$, where V represents the first component video signal, U represents the second component video signal, k is a constant, and c is a value greater than or equal to zero and less than or equal to one.

13. The method according to claim 10, wherein a base of a respective transistor of the pair of transistors of the first differential amplifier is directly connected to a base of a respective transistor of the pair of transistors of the second differential amplifier.

14. The method according to claim 10, wherein the emitters of each pair of transistors are connected to ground via a transistor connected in series with a resistor.

15. A method for controlling tint of component video signals, the method comprising the steps of:

receiving a first component video signal;

receiving a second component video signal;

providing circuitry including a first differential amplifier and a second differential amplifier for receiving the first and second component video signals, respectively, the first and second differential amplifiers each including a pair of transistors;

outputting a first tint control adjustment signal for the first component video signal; and outputting a second tint control adjustment signal for the second component video signal, wherein a collector of one transistor of the pair of transistors of the first differential amplifier is connected to an input via a resistor for receiving the first component video signal and to an output for outputting the first signal.

16. A method for controlling tint of component video signals, the method comprising the steps of:

receiving a first component video signal;

receiving a second component video signal;

providing circuitry including a first differential amplifier and a second differential amplifier for receiving the first and second component video signals, respectively, the first and second differential amplifiers each including a pair of transistors;

outputting a first tint control adjustment signal for the first component video signal; and outputting a second tint control adjustment signal for the second component video signal, wherein a collector of one transistor of the pair of transistors of the second differential amplifier is connected to an input via a resistor for receiving the second component video signal and to an output for outputting the second signal.

17. A method for controlling tint of component video signals, the method comprising the steps of:

receiving a first component video signal;

receiving a second component video signal;

providing circuitry including a first differential amplifier and a second differential amplifier for receiving the first and second component video signals, respectively, the first and second differential amplifiers each including a pair of transistors;

outputting a first tint control adjustment signal for the first component video signal; and outputting a second tint control adjustment signal for the second component video signal, wherein a base of one transistor of the pair of transistors of the first differential amplifier is connected to an input via a resistor for receiving a control signal for the first component video signal.

18. A method for controlling tint of component video signals, the method comprising the steps of:

receiving a first component video signal;

receiving a second component video signal;

providing circuitry including a first differential amplifier and a second differential amplifier for receiving the first and second component video signals, respectively, the first and second differential amplifiers each including a pair of transistors;

outputting a first tint control adjustment signal for the first component video signal; and outputting a second tint control adjustment signal for the second component video signal, wherein a base of one transistor of the pair of transistors of the second differential amplifier is connected to an input via a resistor for receiving a control signal for the first component video signal.

* * * * *